United States Patent Office 2,916,438
Patented Dec. 8, 1959

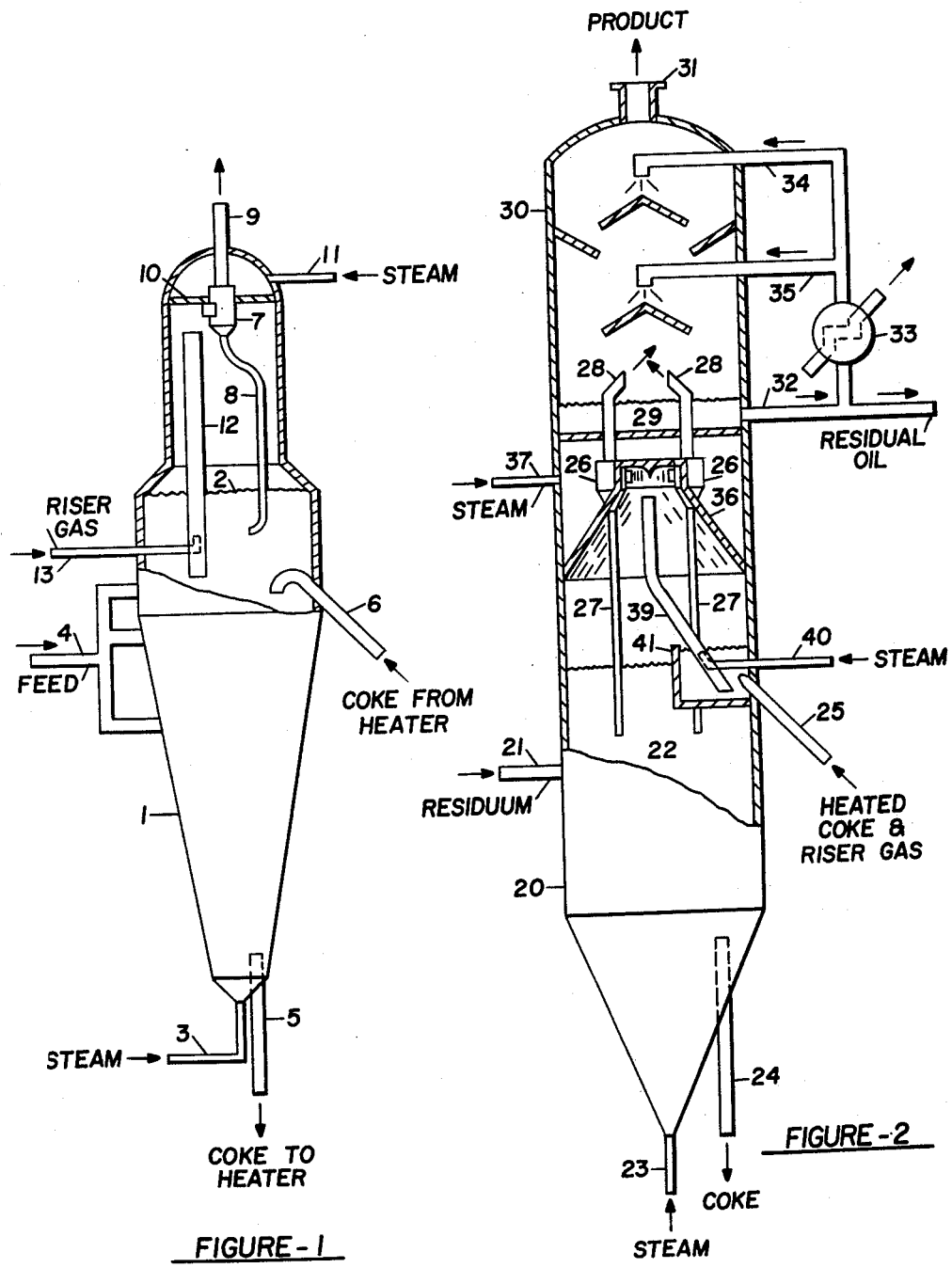

2,916,438

PREVENTION OF DISPERSE PHASE COKING IN FLUID COKING APPARATUS

Charles E. Jahnig, Rumson, N.J., and Donald Dunwody Dunlop, Baton Rouge, La., assignors to Esso Research and Engineering Company, a corporation of Delaware Application November 25, 1955, Serial No. 549,106

3 Claims. (Cl. 208—127)

This invention relates to an improved fluidized solids reaction vessel for contacting particulate solids and fluids at high temperatures. This invention is more particularly concerned with a means and method for preventing coke deposition in the disperse solids phase above the fluid coking bed of a hydrocarbon oil fluid coking reactor.

In brief compass, this invention proposes apparatus for the coking of hydrocarbon oils which comprises, in combination, a vertically disposed reaction vessel, a fluidized coking bed of solids therein with a disperse solids phase thereabove, a cyclone separating system in the upper portion of the disperse solids phase, conversion product withdrawal means connected with the cyclone separating system, conduit means for circulating solids from the coking bed through an external heating zone and back to the upper portion of the coking bed, and an internal riser conduit for transferring solids from the upper portion of the coking bed to the upper portion of the disperse solids phase in the vicinity of the inlet to the cyclone separating system.

In a particularly preferred embodiment, an overflow pot or hot solids receiver is placed in the upper portion of the coking bed. It receives the freshly reheated solids being introduced into the coking bed. The initial portion of the internal riser is immersed in solids within the overflow pot, whereby freshly reheated solids are conveyed through the internal riser to the upper portion of the disperse solids phase. This particular arrangement, because the solids are at a substantially higher temperature in the overflow pot, permits a much lesser amount of solids to be transferred to maintain a given temperature in the disperse solids phase. The overflow pot also acts as a segregation zone for the conveying or riser gas normally used to transfer the freshly reheated solids to the coking zone, whereby the riser gas enters the disperse phase without passing through the fluid coking bed and serves as a true diluent in the disperse phase, lowering the dew point of the conversion products.

The prior art is familiar with a fluid coking process wherein an oil is pyrolytically upgraded by contact at a coking temperature with particulate solids maintained in a fluidized condition in a coking vessel. Upon contact with the solids, the oil undergoes pyrolysis, evolving lighter hydrocarbons and depositing carbonaceous residue on the solid particles causing them to grow in size. The necessary heat for the pyrolysis is supplied by circulating a stream of the fluidized solids through an external heating zone, e.g., a combustion zone, and back to the coking vessel. This fluid coking process is more fully presented by co-pending application entitled "Fluid Coking of Heavy Hydrocarbon and Apparatus Therefor," S.N. 375,088, filed August 19, 1953, now U.S. Patent No. 2,881,130, by Pfeiffer et al.

The hydrocarbon oil which forms the coking charge stock of the present process is preferably a low value high-boiling residuum of about −10 to 20° A.P.I. gravity, about 5 to 50 wt. percent Conradson carbon, and boiling above about 900° to 1200° F. Broadly, however, any hydrocarbon oil may be treated in the present process, including shale oils, tars, asphalts, oils derived from coals, synthetic oils, recycled heavy ends from the coker effluent, whole crudes, heavy distillate and residual fractions therefrom, or mixtures thereof.

The vaporous conversion products are customarily recovered overhead from the fluid coking bed, and are passed through a cyclone separating system located in the upper portion of the disperse solids phase above the coking bed. The cyclone system removes entrained solids from the vapors and returns them to the coking bed.

Serious problems have been encountered in the development of this type of coking. One problem in particular is the building up of coke deposits on the confines of the vapor space above the fluidized bed. These deposits cause the pressure drop through the coker and overhead lines to increase to such an extent as to require the coker to be shut down periodically and cleaned out.

As the vapors leaving the coking bed are at or near their dew or condensation point, they will readily condense on contiguous equipment surfaces, particularly in areas of stagnation. This condensation is aggravated by heat loss and polymerization and condensation reactions occurring in the vapor phase.

It has previously been appreciated that this problem of coke deposition in the disperse solids phase can be alleviated by introducing solids, preferably solids having a temperature higher than the coking temperature, into the disperse phase. The solids so introduced uphold the temperature of the vapors, thereby preventing condensation, provide surface to receive any condensate that may form, and scour and heat attendant equipment surfaces. Disperse phase coking can also be offset by introducing a diluent gas into the conversion products to lower the dew point of the vapors, but this method of operation is fairly expensive.

Certain stagnant areas of the disperse solids phase, particularly those above the inlet of the cyclone separating system, are conventionally protected or sealed off by baffles so that vapors cannot enter. A steam purge is usually used behind these baffles.

While these principles have been understood, it has been difficult in practice to devise apparatus that satisfies them. Existing means so far designed have proved inadequate. For example, it has been suggested to introduce all of the freshly reheated solids coming from the coke heating zone into the disperse solids phase. This supplies, however, solids in an amount far in excess of what is required and disrupts cyclone efficiency. Also, the temperature of the disperse phase is maintained at too high a level and is not easily controlled, so that excessive vapor phase cracking occurs with a consequent loss in product quality and yield.

It has also been proposed to use a separate external line or hot solids riser to convey the requisite coke from the external heating zone to the disperse phase. Such an external line has proved costly and has not been sufficiently reliable to solve the problem. It has been substantially impossible to avoid using bends or turns in such a hot solids riser, which is undesirable because bends are very prone to erosion, slugging, and plugging. Hence it has been difficult to properly control the flow of solids to the disperse solids phase.

The present invention proposes a novel solution to this particular mechanical problem of supplying hot solids to the disperse solids phase of a fluid coking vessel. Through this particular design, disperse phase coking is effectively prevented, and materially improved performance and reliability are obtained.

Succinctly, this invention proposes to internally convey solids via a hot solids riser from the upper portion of the fluid bed, where they are at a somewhat higher temperature than the average bed temperature, to the upper portion of the disperse solids phase. It is much preferred to eject into the disperse solids phase dry solids that have been freshly reheated because a lower amount of solids can be used. Special means are provided for this in a preferred embodiment of this invention.

This invention will become clear from the following description of the drawings attached to and forming part of this specification. For convenience, the operating conditions applicable to this drawing are summarized in Tables I and II presented hereinafter.

In the drawings:

Figure 1 schematically illustrates a coking vessel containing a simplified version of this invention.

Figure 2 depicts in greater detail a preferred embodiment of this invention.

Referring to Figure 1, there is shown a coking vessel 1 containing a dense, turbulent, fluidized coking bed of particulate solids having an upper level 2. Any convenient, finely divided solid can be used in the practice of this invention including catalytic solids, pumice, kieselguhr, sand, spent cracking catalyst, etc. Particulate fluid coke produced by the process, having a particle size within the range of 10 to 1000 microns, is the preferred contact solid. Steam or other fluidizing gas is admitted to the base of the vessel by line 3 to fluidize the solids. Feed, e.g., a vacuum residuum, is introduced into the vessel at a plurality of points via line 4. Upon contact with the heated solids, the feed undergoes vaporization and coking, evolving vaporous conversion products and depositing coke on the solids.

To maintain the coking temperature in a range of about 850° to 1600° F., solids are withdrawn from the base of the coking zone by line 5 and transferred to an external heating zone, e.g., a fluid bed burner wherein they are heated to a temperature 50° to 400° F. above the coking temperature. Freshly reheated solids from the heating zone are introduced into the upper portion of the coker via line 6.

Vaporous conversion products pass through the upper level 2 of the coking bed, through the disperse solids phase, to a cyclone system 7. There is normally a small amount of entrainment from the bed, usually about 100 pounds of entrained solids per barrel of feed, but this is not sufficient to prevent disperse phase coking. Entrained solids are removed from the conversion products in cyclone system 7 and are returned to the coking bed via dipleg 8. The conversion products are recovered from the cyclone via line 9 and further treated as desired, e.g., by scrubbing, fractionation, desulfurization, etc.

To seal off stagnant areas in the disperse solids phase, a baffle 10 may be placed in the reactor above the inlet to the cyclone system, and steam from line 11 may be introduced into the sealed off area to positively prevent vapors from entering.

In normal operation, coke deposits form above the level of the fluid bed on the surfaces of equipment encompassing or in the disperse solids phase. In extreme cases, coke deposits will also form in the cyclone system and in lines leading from the cyclone system. These coke deposits have become so severe in the past as to cause shutdown of the equipment.

According to this invention, solids are ejected into the disperse solids phase to maintain a concentration of solids therein beyond the amount normally entrained by the vapors. The solids are introduced into the disperse phase in a particular manner through a particular arrangement of apparatus.

In the arrangement shown in Figure 1, solids are transferred from the upper portion of the fluid coking bed through a hot solids riser or conduit 12 to the disperse phase in the vicinity of the cyclone system inlet. Steam or other inert riser gas is admitted to riser 12 by line 13 in controlled amounts. The solids at the upper portion of the fluid coking bed have a somewhat higher temperature, e.g., 5–25° F. higher, than the average coking bed temperature and, therefore, the solids introduced into the disperse solids phase will serve to give some superheat to the conversion products, thereby preventing condensation. It is preferred, however, to maintain the disperse solids phase temperature within 100° F. of the bed temperature. The principal purpose of this particular design is, however, to supply a large amount of solids to the disperse phase for scouring purposes. This can be done because the solids are not at an excessively high temperature, whereas in the design of Figure 2, the high temperature of the solids introduced into the disperse phase places a practical limit on the amount that can be used while avoiding excessive detrimental vapor phase cracking. The riser gas lifts the solids through riser 12 in a manner known by those familiar with fluidized solids techniques. The amount of gas used is normally in the range of ½ to 2 actual cubic feet per pound of solids conveyed. The riser is, preferably, as straight as possible to avoid erosion difficulties.

To alleviate the problem of disperse phase coking, it is essential that at least 400 pounds of solids, including entrained solids, be introduced into the disperse phase per barrel of fresh feed. This will normally include around 300 pounds or more per barrel of fresh feed supplied through riser 12. Below this amount, coke deposition is not offset. The introduction of more than about 1000 pounds of solids per barrel of feed into the disperse phase has little effect on disperse phase coking, and can result in excessive vapor phase cracking and pressure drop through the cyclones. In particularly large installations and where more than one cyclone is used, it will be appreciated that more than one hot solids riser can be used to improve distribution.

Referring now to Figure 2, there is shown an integral coking zone-scrubbing zone arrangement. Charging stock is admitted into coking vessel 20 via line 21 and contacts therein a fluid bed 22 of coke particles maintained at a coking temperature. Steam is admitted to the base of the vessel via line 23 to fluidize the solids. Coke is withdrawn by line 24 and transferred through a heating zone and returned by line 25 to maintain the coking temperature. Conversion products pass overhead from the coking bed through a disperse solids phase to cyclone separating system 26, comprising in this case, two cyclones. Entrained solids are removed from the conversion products in the cyclones and returned to the coking bed via diplegs 27. The conversion products are then transferred by conduits 28 to the scrubbing zone. In the scrubbing zone they contact a cool scrubbing or quench liquid to arrest further cracking of the vapors. This scrubbing removes the heavy, high boiling, contaminate containing ends of the vapors and these, along with the scrubbing liquid, collect in a reservoir 29 in the base of the scrubbing zone. The cool conversion products are withdrawn overhead from the scrubbing zone 30 via line 31 and may be further treated as desired. Liquid is withdrawn from reservoir 29 by line 32 and a portion of it may be removed as a residual oil product, or be recycled to the coking zone for further treatment. The remainder is cooled in exchanger 33 and introduced into the upper portion of the scrubbing zone by lines 34 and 35 as the scrubbing liquid.

Returning to the disperse solids phase, a conical anticoking baffle 36, extending from about the mid-point of the zone and encompassing the inlets of the cyclones, is used to screen off normally stagnant areas and to increase the velocity of vapors in that portion of the disperse phase. Steam or other purging gas is admitted behind this baffle by line 37, and flows continuously into the reactor dilute phase, through the clearances around the baffle. This assures absence of coking in the area above the baffle.

According to this invention, solids are transferred to the upper portion of the disperse phase by riser 39 which is supplied with riser gas or conveying gas, e.g., steam, by line 40 in amounts controlled to effect the desired conveyance of solids. In a preferred design, riser 39 initiates in an overflow pot 41 that is placed about the point where the hot solids in line 25 are introduced into the coking vessel. This overflow pot segregates the freshly reheated solids which are at a temperature substantially above the coking temperature, and permits highly heated solids to be transferred to the disperse phase. Because of this, a lesser amount of solids can be used to offset disperse phase coking.

This overflow pot or hot solids receiver arrangement has another advantage which is a distinct improvement over the arrangement of Figure 1. The riser gas or conveying gas, customarily used to convey the freshly reheated solids is prevented by this overflow pot from coming in contact with the solids in the upper portion of the fluid coking bed. This conveying gas does not, therefore, have an opportunity to come into equilibrium with the oil film on the solids of the coking bed. It passes instead directly into the disperse solids phase and serves as a true diluent to lower the dew point of the conversion products. Also, because it is at the temperature of the reheated solids, it serves to give some degree of superheat to the conversion products.

The submergence of the riser 39 in the seal pot must be sufficient to balance the pressure drop in riser 39. For a 20 ft. high riser, it is usually sufficient to have the bottom of riser 39 four feet below the dense bed level.

Table I presents a summary of the range of pertinent operating conditions, and also presents a specific example of the apparatus illustrated in Figure 2. Table II elaborates on the coker described in the specific example of Table I.

*Table I*

|  | Preferred Range | Example |
|---|---|---|
| Operating Conditions: |  |  |
| Temperature of fluid bed, °F | 900 to 1,050 | 950 |
| Pressure at cyclone inlet, p.s.i. | 5 to 25 | 6 |
| Feed rate, wt./hr./wt. of fluidized solids | 0.3 to 2.0 | 0.7 |
| Fluidizing steam rate, wt. percent on fresh feed | 5 to 20 | 8 |
| Coke circulation rate from heater, lbs./lb. fresh feed | 5 to 15 | 10 |
| Amount of coke injected into disperse phase, lbs./lbs. fresh feed | 0.2 to 5 | 1 |
| Temperature of disperse phase, °F. above bed temp. | 5 to 100 | 20 |
| Average solids content of disperse phase, lbs./cu. ft. | 0.1 to 2 | 0.5 |

*Table II*

| | |
|---|---|
| Amount of fluidized coke, 20 to 200 mesh, tons | 100 |
| Fluidized bed density, lbs./cu. ft. | 40 |
| Distance from bed level to cyclone inlets, ft. | 20 |
| Diameter of disperse phase, ft. | 12.5 |
| Distance from bottom of conical baffle to cyclone inlets, ft. | 5 |
| Volume of disperse phase, cu. ft. | 2200 |
| Average vapor residence time in disperse phase, etc. | 6.0 |

Having described this invention, what is sought to be protected by Letters Patent is succinctly set forth in the following claims.

What is claimed is:

1. Apparatus for cracking higher boiling hydrocarbons to lower boiling hydrocarbons which includes a vertically arranged reaction vessel adapted to contain a fluidized bed of solids in its lower portion with a disperse solids phase in its upper portion, means for introducing oil to be cracked into the fluidized bed of solids in said vessel, cyclone separating means in the upper portion of said vessel, and provided with a vapor removal line, an open overflow pot in the upper portion of said vessel, a conduit for supplying freshly reheated solids to said overflow pot from which the solids overflow into the fluidized bed in said vessel, a vertically arranged internal open ended pipe having its lower end projecting into said overflow pot and adapted to be submerged below the freshly reheated solids therein and having its upper open end in the region of the inlet to said cyclone separating means, means for introducing a lift gas into the lower portion of said internal pipe to transfer freshly reheated solids from said overflow pot to the upper portion of said vessel directly to the vicinity of the inlet to said cyclone separating means, and means for withdrawing solids from said vessel and returning them at least in part to said overflow pot as reheated solids.

2. A process for cracking hydrocarbon oil which comprises injecting an oil to be cracked into a dense turbulent fluidized bed of solids maintained in a coking zone at a cracking temperature to convert the oil to vaporous conversion products, passing the vaporous conversion products upwardly from said dense turbulent fluidized bed through a disperse solids phase above said dense fluidized bed, removing entrained solids from vaporous conversion products in a cyclone separation zone in the upper portion of said coking zone and said disperse solids phase and removing separated vaporous conversion products overhead, withdrawing solids from the lower portion of said dense fluidized bed and returning freshly reheated solids to a separate overflow zone in the upper portion of said coking zone to supply heated solids to said dense fluidized bed by overflow from said overflow zone and internally conveying freshly heated solids from said overflow zone as a confined stream to the upper portion of said disperse solids phase in the vicinity of the inlet to said cyclone separation zone to maintain the temperature of the vaporous conversion products therein and to minimize deposition of coke on the internal surface of said cyclone separation zone.

3. A process according to claim 2 wherein the amount of solids introduced into said disperse solids phase is sufficient to maintain in said disperse solids phase above about 400 pounds of solids per barrel of fresh oil feed.

References Cited in the file of this patent

UNITED STATES PATENTS

| | | |
|---|---|---|
| 2,485,315 | Rex et al. | Oct. 18, 1949 |
| 2,549,117 | Nelson | Apr. 17, 1951 |
| 2,700,017 | Brown | Jan. 18, 1955 |
| 2,706,704 | Squires | Apr. 19, 1955 |
| 2,743,998 | Swart et al. | May 1, 1956 |
| 2,759,880 | Brown | Aug. 21, 1956 |
| 2,824,046 | Kimberlin | Feb. 18, 1958 |